April 11, 1967
R. D. HAUN, JR., ETAL
3,314,021
CATHODOLUMINESCENT PUMPED LASER HAVING
A CATHODE SURROUNDING THE LASER
Filed March 15, 1963
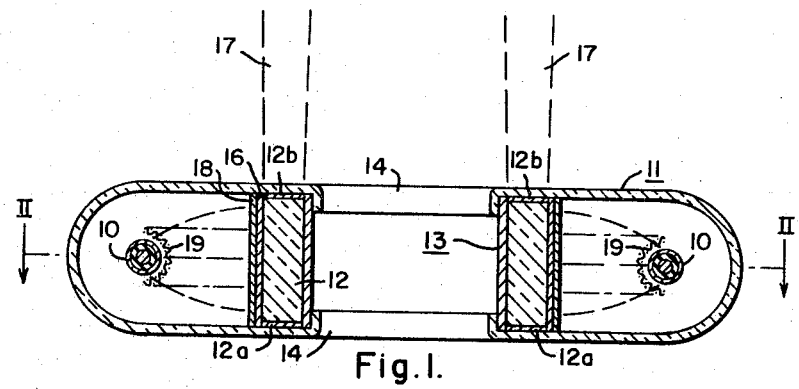
Fig.1.
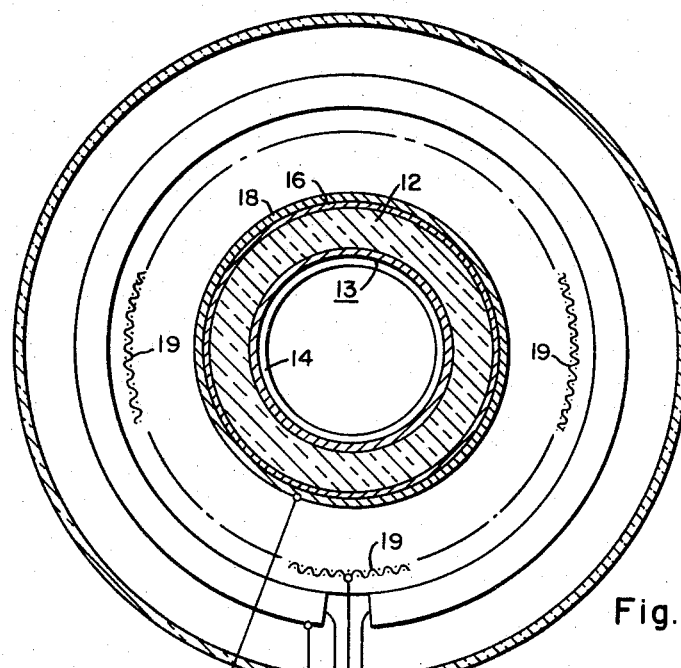
Fig.2.
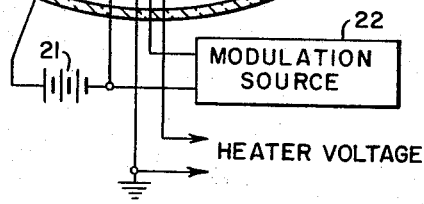
WITNESSES:
Bernard R. Giegney
James F. Young
INVENTORS
Robert D. Haun, Jr. and
Robert C. Ohlmann.
BY
ATTORNEY 3,314,021
CATHODOLUMINESCENT PUMPED LASER HAVING A CATHODE SURROUNDING THE LASER
Robert D. Haun, Jr., Monroeville, and Robert C. Ohlmann, Wilkins Township, Allegheny County, Pa., assignors to Westinghouse Electric Corporation, Pittsburgh, Pa., a corporation of Pennsylvania
Filed Mar. 15, 1963, Ser. No. 265,475
6 Claims. (Cl. 331—94.5)

This invention relates to improvements in optical masers commonly referred to as lasers. More particularly, the invention relates to improvements in lasers pumped by an optical source capable of being modulated at high frequency.

It is well understood that a maser employs an active medium, either gaseous, liquid or solid, in which there can be established by "pumping action" at least intermittently, a non-equilibrium population distribution in at least a pair of the spaced energy states of its electrons. This "pumping" process is also called "state preparation." In this non-equilibrium state, the medium is said to have a negative temperature. Since the system is always tending to revert to the equilibrium state by a process competing with the pumping process, known as relaxation, the negative-temperature condition represents stored potential energy.

Accordingly, it follows that some means is necessary to supply energy to such a system to excite the electrons from their equilibrium states to the non-equilibrium states. In such a system, the stored potential energy is evidenced by the negative temperature of the active medium and when the energy is released it will be in the form of wave energy of a predetermined frequency or frequencies. The frequencies are determined by the negative temperature states which satisfy Planck's law with respect to any two energy levels, which are in non-equilibrium, represented by the equation $$\nu = \frac{E_2 - E_1}{h} \qquad (1)$$

where $E_2$ and $E_1$ represent, respectively, the upper and lower energy levels and $h$ is Planck's constant. If there be applied to the active medium, which is at a negative temperature, a frequency which satisfies Equation 1 the applied signal will stimulate the emission of radiation at the signal frequency and the radiated energy will be in phase with, and amplify, the applied signal.

This may be a continuous process if energy is continuously supplied to the medium in the form of the pumping energy to cause continuously, in a cyclic fashion, electrons of the active medium to be excited from one or more of the lower enregy states to higher energy states from which the electrons fall back to lower energy states as they emit radiation to complete their energy-transition cycle.

In lasers the pump frequency is usually higher than the lasing, or amplifying frequency. Also in converting from the usual commercial power sources to energy at the pump frequency there are usually two or three energy conversion steps involved. The last step also usually, but not always, involves a conversion from electrical to radiant energy. The means involved in such conversion steps never achieves 100% efficiency since there are necessarily energy losses involved. Also in some lasers, particularly those using a solid state active medium, the energy supplied to create the negative temperature of the medium is at frequencies representing energy state difference substantially greater than those corresponding to the frequency of the signal to be amplified. This means that energy at any frequency absorbed by the active medium, but not at a frequency that can be used in the stimulated emission radiation amplification process results in heating of the medium and thereby causes a decrease in overall efficiency. Energy falling on the medium but not in the absorption band is lost since not being absorbed in the medium, it takes no part in the pumping process but instead is lost by absorption on the walls of the envelope.

There is a greater probability for a portion of the atoms of active media being excited to higher energy states by wave energy in certain bands of frequencies than for other atoms. Since the atoms absorb energy as they go from their lower to their higher energy states, this band of frequencies constitutes the absorption band of the media. The atoms excited to the higher states do not return to their lower energy states by the same route by which they go to their higher states. Many of these more highly excited electrons spontaneously emit radiation as they go from their higher states to lower states and then when there is an interaction between wave energy and a frequency which corresponds to the difference between the energy states to which they have spontaneously emitted and their lower normal state, they emit coherent electromagnetic wave energy by stimulated emission of radiation. The energy at frequencies corresponding to the difference between the energy level from which stimulated emission occurred and the other energy states in the absorption band must be absorbed by the active medium in the form of heat. It is for this reason that it is desirable to pump a medium with energy at a frequency as close as possible to that at which the stimulated emission radiation occurs in order to reduce the amount of energy which is dissipated to the lattice structure of the crystal and thereby to reduce the amount of the heating of the medium. Heating of the medium not only reduces the efficiency but it also adversely affects the lasering action. In accordance with the present invention the absorption band of the active maser material is so related to the pump frequency spectrum that substantially all of the output frequency spectrum of the pump source falls within the absorption band of the active medium and is at the same time near the frequency at which stimulated emission takes place, thus increasing the overall efficiency.

Accordingly the primary object of the present invention is to provide an improved optical maser embodying improved means for converting electrical energy to optical energy for state preparation of the medium at improved efficiency.

In a copending application filed in the name of Irwin Wieder, Ser. No. 220,938, filed Aug. 27, 1962, which is a continuation of application Ser. No. 816,582, filed May 28, 1959, now abandoned, owned by the assignee of this application, a system is described and claimed in which energy at optical frequencies is derived from a source of electrical power, either direct current or at the commercial power source frequencies, for pumping active maser media to produce state preparation for laser action. In this copending application advantage is taken of the fact that in some media the absorption band is wider than the spectrum of the emission band and therefore a source of light having a rather wide band of frequencies is absorbed by the media and then emitted at the narrow substantially line spectrum. While the means shown therein is an improvement over prior art devices, the present invention provides an improvement over the system in the copending application in that it provides means for more efficiently converting electrical energy to optical energy substantially all of which is within the absorption band of the active media and very close to the emission band of the media and therefore results in a very greatly increased efficiency in state preparation of the media.

Another object of the invention is to provide a new and improved arrangement in an optical maser for providing efficient optical coupling between the source of optical energy and a solid state active media.

Another object is to provide a new and improved solid state optical maser in which the amplitude of the pumping energy can be faithfully modulated at high frequencies.

A still further object is to provide a new and improved solid state optical maser capable of operating at increased efficiency.

Another object is to provide a new and improved optical maser in which a sample of solid state medium is pumped by a layer of electron-excited phosphor surrounding said medium in juxtaposed relation thereto.

The invention itself, both as to its organization and method of operation as well as additional objects and advantages will best be understood from the following description when read in connection with the accompanying drawings in which:

FIGURE 1 is an isometric view, with a section broken away illustrating a preferred embodiment of the present invention; and FIG. 2 is a cross sectional view on line II—II of FIG. 1 and looking in the direction of the arrows.

Broadly speaking, the present invention comprises means for providing a high-current, high-density, high-voltage electron beam which is directed onto a layer of phosphor having a fast-decay-time wherein the phosphor has been so chosen that its emission frequency coincides with the absorption band of the laser material. In the illustrated embodiment solid state material is shown but the invention is also applicable to gaseous or liquid active material.

The electrical energy used in providing the electron beam is converted to optical energy at the pump frequency by the phosphor which is placed in juxtaposition to the optical maser active medium. By using an active medium in which the absorption band is near the rediation emisson band high quantum efficiency is obtained and therefore a very high percentage of the optical energy is utilizable in causing state preparation of the electrons of the active medium. This greatly enhances the overall efficiency of the system as compared to systems heretofore provided.

Since the radiation spectrum of the phosphors is determined by the energy levels of the activators in the phosphor crystal lattice structure the phosphor emission spectrum can be matched to the absorption band of the active medium by the proper choice of activators and the crystal lattice structure to obtain the best pump efficiency and the least heating of the laser medium. The density of the radiation, that is, the amplitude of the emitted optical energy, is determined by the density and the voltage of the exciting electron beam and, therefore, the source of emitted radiation can be readily modulated by suitably modulating the electron beam.

On the other hand the period between the relaxation oscillations, which are obtained when the pump and the material perimeter are adjusted to give the stimulated emission and can be varied in accordance with the pump power.

The device briefly described above may be referred to as a cathodoluminescent pumped optical maser. An embodiment of such a device in accordance with the present invention is illustrated in the drawings. Referring to FIG. 1, a suitable annular cathode 10 heated by a heater not shown, is suitably arranged and mounted in a toroidal shaped envelope 11 which may be made of glass or any other suitable optically transparent material. This envelope is evacuated in accordance with techniques well known in the art of electron discharge devices. The electrons emitted from the cathode 10 are directed against a suitable fast phosphor material which will be excited into luminescence. The phosphor is placed in juxtaposition to a body of active maser medium. The phosphor is so chosen that its frequency of luminescence substantially coincides with the pump absorption band of the medium.

To this end, a hollow cylindrical rod 12 of active maser medium is placed at the center of the envelope 11. As illustrated, a suitable reflecting metal cylinder 13 is sealed to the inside flanges 14 of the envelope 11 in concentric juxtaposed relation with the cylinder 13. This cylinder 13 acts both as a vacuum seal and as a reflector of pumping radiation not absorbed on its first pass through the material. On the outer surface of the maser rod 12 there is deposited a thin layer 16 of fast-decay-time phosphor, the emission frequency of which has been chosen to coincide with the pump absorption band of the maser rod 12. The ends of the cylinder 12 are optically polished, optically parallel and are provided with reflective coatings 12a and 12b, such as aluminum. The reflective coating 12a on one end of the rod is substantially totally reflective while the coating 12b on the other end is partially reflective so that all of the optical energy from the laser medium, after it has completed several reflections between the reflective surfaces will be directed through the partially reflective coating 12b in one direction to form a coherent radiation beam, such as that illustrated at 17.

On the outside of the layer of phosphor 16 is a deposited thin electrically conductive, electron-permeable film of aluminum indicated at 18. This layer is similar to aluminized layers deposited on the targets of television cathode ray tubes and is pervious to electrons from the cathode 10. The aluminum film 18 serves the dual function of an electron collecting electrode (or anode) and as an optical reflector for directing the optical energy from the phosphor 16 toward the maser medium. For the purpose of cutting on and off the flow of electrons and otherwise modulating the flow of electrons from the cathode 10 toward the inner cylindrical structure of the unit, including the aluminum film 18, an annular grid 19 is suitably supported, in accordance with well known practice, between the cathode 10 and the inner cylindrical unit of the device.

FIG. 2 illustrates the electrical circuitry asssociated with the cathodoluminescent optical pumping system of the present invention. Any suitable source of electrical energy could be provided for energizing the cathode 10. Preferably, in order to provide the required high current densities the cathode 10 is of the dispenser type as described at pages 536 to 548, Materials and Techniques for Electron Tubes, by W. H. Kohl, 1960 edition. A suitable source of high direct current potential 21 is connected between the cathode 10 and the aluminum film 18. The potential on the aluminum film 18 is used to accelerate the electrons from the cathode. This film 18, when connected as shown in FIG. 2, also serves the well known function of preventing the formation of a charge on the surface of the phosphor 16 which would reduce the flow of electrons to the phosphor if allowed to build up. Between the cathode side of the source of potential 21 and the control grid 19 is a source of modulation potential 22 for the purpose of controlling the flow of the electrons to the aluminum film 18 and the phosphor layer 16. It will be readily apparent that by applying a suitable negative voltage on the control grid 19 the electron flow can be cut off to provide pulsed operation of the electron beam. Since the phosphor layer 16 responds substantially instantaneously to the stream of electrons and there is a linear relation between excitation of the phosphor by the electrons and the luminescence of the phosphor, the optical radiation can be faithfully modulated in accordance with the variation of the potential on the control grid 19. Thus, the lasering operation of the present device can be conveniently and efficiently modulated by modulating the electrons from cathode 10.

By way of illustration only and not intending to limit the invention, for laser rod medium of $CaF_2:Sm^{+2}$, which has a pump absorption band at 6200 A. with half-width approximately 500 A., a suitable phosphor, such as ZnSCdS:Ag may be used which latter phosphor has a peak in fluorescence at about 5700 A. of half-width approximately 1000 A. The amount of optical energy which must be incident upon the $Sm^{2+}$ doped $CaF_2$ to obtain maser oscillations is of the order of 20 watts/cm.$^2$. Fluorescent output of the order of 100 watts/cm.$^2$ can be obtained by exciting ZnSCdS:Ag with 50 kv. electrons at a current density of $10^{-1}$ amp/cm.$^2$. Sufficiently high density electron beams can be provided when using a dispenser cathode which is capable of current densities of several amp/cm.$^2$. Since the $Sm^{2+}$ doped $CaF_2$ must be cooled to liquid nitrogen temperature for proper lasering operation, any suitable provision can be made for maintaining the active medium at substantially liquid nitrogen temperature.

It will be apparent that other active maser media could be operatively associated with appropriate phosphors in accordance with the rules described herein for matching the emission spectrum of the selected phosphors with the absorption spectrum of the maser media in connection with the illustrated embodiment. Also those skilled in the art could provide any necessary heat exchange apparatus for dissipating heat due to operation from either the laser medium or the phosphor, care being taken not to interfere with the flow of electrons to the phosphor or with the optical coupling between the phosphor and maser medium.

It will be seen that the present invention provides a system in which a phosphor of selected properties is arranged in juxtaposed relation with the maser material to be excited to generate coherent optical energy from the electrical energy which is supplied through the electron beam from the cathode 10. In this arrangement, the electron beam flows in the same direction in which the optical energy is directed toward the phosphor, the aluminized film serving as a reflector for directing the optical energy from the phosphor toward the maser material. In this arrangement the phosphor is close enough to the maser material so that of the order of 50% of the optical energy emitted by the phosphor will impinge on the maser material. The overall efficiency for the conversion of electrical to optical energy usable in lasering operations is substantially greater than in any device heretofore provided using solid state maser material.

When the term "optical energy" is used herein it is to be understood to include all radiant or electromagnetic wave energy that can be emitted by an electron-excited phosphor and absorbed by active maser media.

The invention is not to be construed as limited to the single embodiment illustrated but is to be interpreted as including equivalent embodiments which could be formulated by those skilled in the art in accordance with the inventive concept taught herein.

We claim as our invention:

1. Maser apparatus comprising a sample of solid state active medium in the form of a cylindircal annulus having a selected energy absorption spectrum, a layer of a luminescent phosphor pumping means surrounding said sample in juxtaposed relation thereto and responsive to irradiation by electrons for producing optical photon energy for pumping said medium to produce a negative temperature therein, an annular cathode surrounding said medium and said phosphor, and a conducting film pervious to electrons on said phosphor constituting an anode for the electrons from said cathode and further constituting a reflector for optical photon energy.

2. Maser apparatus comprising a sample of solid state active medium in the form of a cylindrical annulus having a selected energy absorption spectrum, a luminescent phosphor pumping means surrounding said sample in juxtaposed relation thereto and responsive to irradiation by electrons for producing optical photon energy for pumping said medium to produce a negative temperature therein, an annular cathode surrounding said medium and said phosphor, and a conducting film pervious to electrons on said phosphor constituting an anode for the electrons from said cathode and further constituting a reflector for said optical photon energy, and a control electrode between said cathode and said conducting film.

3. Maser apparatus comprising a body of negative temperature medium in the form of a cylindrical annulus, means forming an envelope for an electron discharge device enclosing at least the peripheral surface of said body, an annular cathode in said envelope surrounding said body, a layer of luminescent phosphor on the outer surface of said body of medium and within said envelope, a thin optically-reflecting, electrically-conducting metal film pervious to electrons on said phosphor layer and constituting an anode for the electrons from said cathode, the electrons from said cathode bombarding said phosphor through said film to cause said phosphor to emit optical photon energy which is reflected toward said medium by said metal film to pump the latter.

4. The combination as set forth in claim 3 in which said medium is $CaF_2:Sm^{+2}$ and said phosphor is ZnCdS:Ag.

5. The combination as set forth in claim 3 in which there is a control electrode between said cathode and said anode for modulating the excitation of said phosphor layer and thereby modulating the pumping of said negative temperature medium.

6. The combination as set forth in claim 5 in which there is an inner reflecting cylindrical surface in said annulus to confine the optical pumping energy.

References Cited by the Examiner

UNITED STATES PATENTS

| | | | |
|---|---|---|---|
| 1,618,499 | 2/1927 | White | 313—6 X |
| 1,871,357 | 8/1932 | Brace | 313—5 |
| 3,202,934 | 8/1965 | Coffee | 331—94.5 |

JEWELL H. PEDERSEN, *Primary Examiner.*

RONALD L. WIBERT, *Examiner.*

E. S. BAUER, *Assistant Examiner.*